(12) United States Patent
Han et al.

(10) Patent No.: US 10,778,410 B2
(45) Date of Patent: Sep. 15, 2020

(54) HOMOMORPHIC DATA ENCRYPTION METHOD AND APPARATUS FOR IMPLEMENTING PRIVACY PROTECTION

(71) Applicant: Alibaba Group Holding Limited, George Town (KY)

(72) Inventors: Shuai Han, Hangzhou (CN); Zhangjie Huang, Hangzhou (CN); Huanyu Ma, Hangzhou (CN); Hao Lei, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/783,102

(22) Filed: Feb. 5, 2020

(65) Prior Publication Data

US 2020/0177366 A1    Jun. 4, 2020

Related U.S. Application Data

(63) Continuation of application No. PCT/CN2020/071839, filed on Jan. 13, 2020.

(30) Foreign Application Priority Data

Jun. 18, 2019    (CN) .......................... 2019 1 0528750

(51) Int. Cl.
*H04L 29/06* (2006.01)
*H04L 9/00* (2006.01)
(Continued)

(52) U.S. Cl.
CPC ............ *H04L 9/008* (2013.01); *H04L 9/0637* (2013.01); *H04L 9/0643* (2013.01); *H04L 9/30* (2013.01); *H04L 2209/38* (2013.01)

(58) Field of Classification Search
CPC ......... H04L 9/06; H04L 9/008; H04L 9/0637; H04L 9/30; H04L 209/38
See application file for complete search history.

(56) References Cited

U.S. PATENT DOCUMENTS

| 8,520,844 B2* | 8/2013 | MacKenzie | ........... H04L 9/3013 380/282 |
| 8,532,289 B2* | 9/2013 | Gentry | .................... H04L 9/008 380/44 |

(Continued)

FOREIGN PATENT DOCUMENTS

| CN | 109284627 | 1/2019 |
| CN | 109690551 | 4/2019 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Hosuk Song
(74) *Attorney, Agent, or Firm* — Fish & Richardson P.C.

(57) ABSTRACT

A computer-implemented method, non-transitory, computer-readable medium, and computer-implemented system are provided for implementing privacy protection. In an implementation, a public key pk={N, h} corresponding to a target user is obtained, where h is a generator of a predetermined cyclic group with a size of k in a random number space $Z^*_N$, a length of k is i bits, a length of N is n bits, and i<<n. A random number r is selected, so that $h^r$ belongs to the predetermined cyclic group. To-be-encrypted data m, corresponding to the target user using the public key pk and the random number r, is processed to generate a homomorphic ciphertext $c=(1+N)^m \cdot (h^N \bmod N^2)^r \bmod N^2$. The homomor- (Continued)

phic ciphertext c is provided to the target user, where the homomorphic ciphertext c can be decrypted using a private key sk to obtain the data m.

20 Claims, 5 Drawing Sheets

(51) Int. Cl.
  *H04L 9/30* (2006.01)
  *H04L 9/06* (2006.01)

(56) References Cited

U.S. PATENT DOCUMENTS

| | | | | |
|---|---|---|---|---|
| 8,938,623 | B2* | 1/2015 | Takashima | G09C 1/00 713/189 |
| 9,002,007 | B2* | 4/2015 | Nabeel | H04L 9/008 380/255 |
| 9,264,221 | B2* | 2/2016 | Yung | H04L 9/0618 |

FOREIGN PATENT DOCUMENTS

| | | |
|---|---|---|
| CN | 109840770 | 6/2019 |
| CN | 110348231 | 10/2019 |
| WO | WO 2019072300 | 4/2019 |

OTHER PUBLICATIONS

Nakamoto, "Bitcoin: A Peer-to-Peer Electronic Cash System," www.bitcoin.org, 2005, 9 pages.

Junk, "Extensions to the Paillier Cryptosystem with Applications to Cryptological Protocols," Dissertation Presented to the Faculty of Science of the University of Aarhus, Mar. 2004, 132 pages.

Paillier, "Public-Key Cryptosystems Based on Composite Degree Residuosity Classes," International conference on the theory and applications of cryptographic techniques. Springer, 1999, pp. 223-238.

PCT International Search Report in International Appln. No. PCT/CN2020/071839, dated Apr. 15, 2020, 14 pages [with partial machine translation].

* cited by examiner

US 10,778,410 B2

HOMOMORPHIC DATA ENCRYPTION METHOD AND APPARATUS FOR IMPLEMENTING PRIVACY PROTECTION

CROSS-REFERENCE TO RELATED APPLICATIONS

This application is a continuation of PCT Application No. PCT/CN2020/071839, filed on Jan. 13, 2020, which claims priority to Chinese Patent Application No. 201910528750.9, filed on Jun. 18, 2019, and each application is hereby incorporated by reference in its entirety.

TECHNICAL FIELD

One or more implementations of the present specification relate to the field of encryption/decryption technologies, and in particular, to a homomorphic data encryption/decryption method and apparatus for implementing privacy protection.

BACKGROUND

In many scenarios, users require privacy protection for data content. For example, a blockchain technology (which is also referred to as a distributed ledger technology) is a decentralized distributed database technology, features decentralization, transparency, tamper-resistance, trustworthiness, etc., and is applicable to many application scenarios that require high data reliability. However, data such as transaction amounts of blockchain transactions can be exposed because full transaction data can be publicly queried. For another example, in a multi-party computation scenario, assume that user A holds data to be processed, and user B holds a data processing model. When the data to be processed is processed by using the data processing model, a value of the data to be processed can be exposed if user A sends the data to be processed to user B, and model parameters of the data processing model can be exposed if user B provides the data processing model to user A for use.

SUMMARY

In view of this, one or more implementations of the present specification provide a homomorphic data encryption/decryption method and apparatus for implementing privacy protection.

To achieve the previous objective, the one or more implementations of the present specification provide the following technical solutions:

According to a first aspect of the one or more implementations of the present specification, a homomorphic data encryption method for implementing privacy protection is provided, and includes the following: obtaining public key pk={N, h} corresponding to a target user, where h is a generator of a predetermined cyclic group with a size of k in random number space $Z^*_N$, a length of k is i bits, a length of N is n bits, and i<<n; selecting random number r, so that $h^r$ belongs to the predetermined cyclic group; processing to-be-encrypted data m corresponding to the target user by using public key pk and random number r, to generate homomorphic ciphertext $c=(1+N)^m \cdot (h^r \bmod N)^N = (1+N)^m \cdot (h^N \bmod N^2)^r \bmod N^2$; and providing homomorphic ciphertext c to the target user, where homomorphic ciphertext c can be decrypted by the target user by using private key sk to obtain data m, a value of private key sk is $\alpha = a \cdot k$, and a is a predetermined non-zero value.

According to a second aspect of the one or more implementations of the present specification, a homomorphic data decryption method for implementing privacy protection is provided, and includes the following: obtaining homomorphic ciphertext $c=(1+N)^m \cdot (h^r \bmod N)^N = (1+N)^m \cdot (h^N \bmod N^2)^r \bmod N^2$, where homomorphic ciphertext c is obtained after data m is processed by using public key pk={N, h} corresponding to a target user and random number r, h is a generator of a predetermined cyclic group with a size of k in random number space $Z^*_N$, $h^r$ belongs to the predetermined cyclic group, a length of k is i bits, a length of N is n bits, and i<<n; and decrypting homomorphic ciphertext c based on private key sk of the target user, to obtain data $$m = \frac{c^k \bmod N^2 - 1}{N} \cdot k^{-1} \bmod N$$

before encryption, where a value of private key sk is $\alpha = a \cdot k$, and a is a predetermined non-zero value.

According to a third aspect of the one or more implementations of the present specification, a homomorphic data encryption apparatus for implementing privacy protection is provided, and includes the following: a public key acquisition unit, configured to obtain public key pk={N, h} corresponding to a target user, where h is a generator of a predetermined cyclic group with a size of k in random number space $Z^*_N$, a length of k is i bits, a length of N is n bits, and i<<n; a random number selection unit, configured to select random number r, so that $h^r$ belongs to the predetermined cyclic group; a data processing unit, configured to process to-be-encrypted data m corresponding to the target user by using public key pk and random number r, to generate homomorphic ciphertext $c=(1+N)^m \cdot (h^r \bmod N)^N = (1+N)^m \cdot (h^N \bmod N^2)^r \bmod N^2$; and a ciphertext providing unit, configured to provide homomorphic ciphertext c to the target user, where homomorphic ciphertext c can be decrypted by the target user by using private key sk to obtain data m, a value of private key sk is $\alpha = a \cdot k$, and a is a predetermined non-zero value.

According to a fourth aspect of the one or more implementations of the present specification, a homomorphic data decryption apparatus for implementing privacy protection is provided, and includes the following: a ciphertext acquisition unit, configured to obtain homomorphic ciphertext $c=(1+N)^m \cdot (h^r \bmod N)^N = (1+N)^m \cdot (h^N \bmod N^2)^r \bmod N^2$, where homomorphic ciphertext c is obtained after data m is processed by using public key pk={N, h} corresponding to a target user and random number r, h is a generator of a predetermined cyclic group with a size of k in random number space $Z^*_N$, $h^r$ belongs to the predetermined cyclic group, a length of k is i bits, a length of N is n bits, and i<<n; a ciphertext decryption unit, configured to decrypt homomorphic ciphertext c based on private key sk of the target user, to obtain data $$m = \frac{c^k \bmod N^2 - 1}{N} \cdot k^{-1} \bmod N$$

before encryption, where a value of private key sk is $\alpha = a \cdot k$, and a is a predetermined non-zero value; and a data output unit, configured to output decrypted data m to the target user.

According to a fifth aspect of the one or more implementations of the present specification, an electronic device is provided, and includes the following: a processor; and a memory, configured to store a processor executable instruction, where the processor executes the executable instruction to implement the method according to the first aspect.

According to a sixth aspect of the one or more implementations of the present specification, a computer readable storage medium is provided, where the computer readable storage medium stores a computer instruction, and the instruction is executed by a processor to implement the steps of the method according to the first aspect.

According to a seventh aspect of the one or more implementations of the present specification, an electronic device is provided, and includes the following: a processor; and a memory, configured to store a processor executable instruction, where the processor executes the executable instruction to implement the method according to the second aspect.

According to an eighth aspect of the one or more implementations of the present specification, a computer readable storage medium is provided, where the computer readable storage medium stores a computer instruction, and the instruction is executed by a processor to implement the steps of the method according to the second aspect.

DESCRIPTION OF IMPLEMENTATIONS

Figure 1:
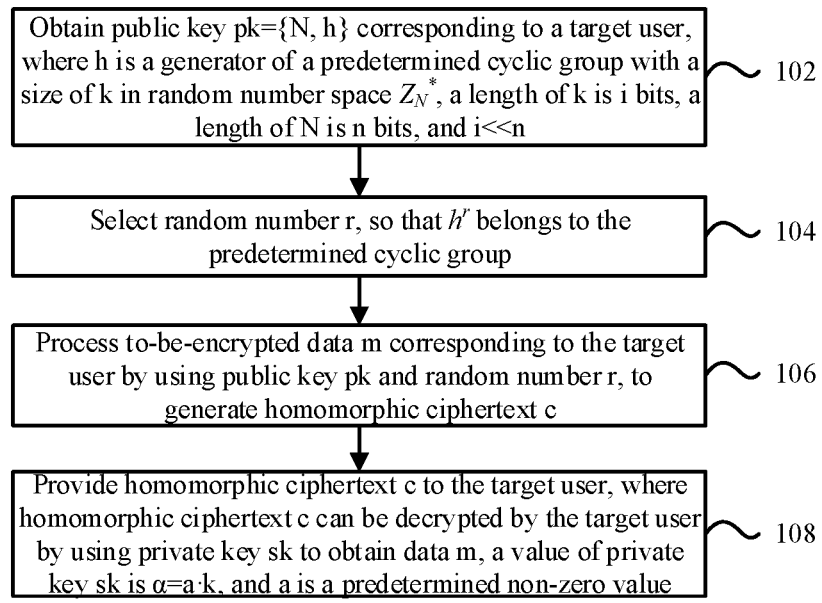
FIG. 1 is a flowchart illustrating a homomorphic data encryption method for implementing privacy protection, according to an example implementation.

Example implementations are described in detail here, and examples of the example implementations are presented in the accompanying drawings. When the following description relates to the accompanying drawings, unless specified otherwise, same numbers in different accompanying drawings represent the same or similar elements. Implementations described in the following example implementations do not represent all implementations consistent with the one or more implementations of the present specification. On the contrary, the implementations are only examples of apparatuses and methods that are described in the appended claims in detail and consistent with some aspects of the one or more implementations of the present specification.

It is worthwhile to note that in other implementations, steps of a corresponding method are not necessarily performed in a sequence shown and described in the present specification. In some other implementations, the method can include more or fewer steps than those described in the present specification. In addition, a single step described in the present specification can be divided into a plurality of steps for description in other implementations, and a plurality of steps described in the present specification can be combined into a single step for description in other implementations.

In a homomorphic encryption technology, raw data can be encrypted into corresponding homomorphic ciphertext, and the homomorphic ciphertext can be directly used for calculation without being decrypted into the raw data. For example, when the calculation is an addition/subtraction operation, it indicates that the corresponding homomorphic encryption technology satisfies additive homomorphism; when the calculation is a multiplication/division operation, it indicates that the corresponding homomorphic encryption technology satisfies multiplicative homomorphism; or when the calculation includes both an addition/subtraction operation and a multiplication/division operation, it indicates that the corresponding homomorphic encryption technology satisfies full homomorphism. Additive homomorphism can be implemented by using homomorphic data encryption/decryption solutions implemented in the present specification.

Before implementing homomorphic encryption/decryption, a user needs to obtain a public and private key pair uniquely corresponding to the user. In other words, each user maintains one public and private key pair, and different users correspond to different public and private key pairs. For example, when holding public key pk_0 and private key sk_0, a certain user can encrypt plaintext data m_0 by using public key pk_0, to obtain corresponding homomorphic ciphertext c_0. In this case, homomorphic ciphertext c_0 can be decrypted into plaintext data m_0 only by using private key sk_0, and homomorphic ciphertext c_0 cannot be normally decrypted by using private key sk_1 held by another user or other data.

In addition, assume that the user encrypts plaintext data m_1 by using public key pk_0, to obtain corresponding homomorphic ciphertext c_1, and encrypts plaintext data m_2 by using public key pk_0, to obtain corresponding homomorphic ciphertext c_2. In this case, homomorphic ciphertext c_0, c_1, and c_2 can satisfy additive homomorphism. For example, the following calculation can be performed on homomorphic ciphertext c_0, c_1, and c_2: c_3=c_0+c_1−c_2. In this case, the user can decrypt c_3 by using private key sk_0, to obtain corresponding plaintext data m_3, and can determine that m_3=m_0+m_1−m_2 based on the previous additive homomorphism feature. Certainly, an operation rule of homomorphic ciphertext is not necessarily the same as an operation rule of plaintext data. For example, when addition of the plaintext data can correspond to multiplication of the homomorphic ciphertext, and subtraction of the plaintext data can correspond to division of the homomorphic ciphertext, the following calculation can be performed on homomorphic ciphertext c_0, c_1, and c_2: c_3=c_0×c_1±c_2. In this case, corresponding plaintext data is m_3=m_0+m_1−m_2.

The homomorphic data encryption/decryption solutions for implementing privacy protection in the present specification are described below with reference to implementations.

FIG. 1 is a flowchart illustrating a homomorphic data encryption method for implementing privacy protection, according to an example implementation. As shown in FIG. 1, the method is applied to a computing device, and can include the following steps.

Step 102: Obtain public key pk={N, h} corresponding to a target user, where h is a generator of a predetermined cyclic group with a size of k in random number space $Z^*_N$, a length of k is i bits, a length of N is n bits, and i<<n.

The computing device can belong to the target user. To be specific, the target user can perform homomorphic encryption on data m by using public key pk corresponding to the target user, to perform privacy protection for a value of data m, or perform another operation. Alternatively, the computing device can belong to a user other than the target user, and public key pk of the target user can be disclosed to the user, so that the user can perform homomorphic encryption on data m based on public key pk, and can even further perform another operation that satisfies additive homomorphism on homomorphic ciphertext c obtained through encryption, and only the target user can decrypt homomorphic ciphertext c or an operation result of homomorphic ciphertext c by using private key sk.

N is a predetermined number. For example, length n of N can be 2048 bits or another length. Implementations are not limited in the present specification. Then, random number space $Z^*_N$ can be determined based on number N. In random number space $Z^*_N$, a predetermined cyclic group can be determined. The predetermined cyclic group has generator h, so that all elements in the predetermined cyclic group can be generated by generator h. For example, the elements in the predetermined cyclic group can be represented as $h^0$, $h^1$, $h^2$ ... When the size of the predetermined cyclic group is k, the elements in the predetermined cyclic group can be represented as $h^0, \ldots,$ and $h^{k-1}$, and all other power of generator h can be cyclically represented as $h^0, \ldots,$ and $h^{k-1}$, for example, $h^k=h^0$, $h^{k+1}=h^1, \ldots,$ and $h^{2-1}=h^{k-1}$.

Step 104: Select random number r, so that $h^r$ belongs to the predetermined cyclic group.

Random number r is randomly selected, but it needs to ensure that $h^r$ belongs to the predetermined cyclic group. Therefore, random number r cannot be selected in a fully random way. Actually, when the size of the predetermined cyclic group is k, $r \in [0, k-1]$ should be ensured.

In addition, when the length of k is i bits, it can be ensured that a length of random number r is also i bits. Compared with length n of N, i<<n, and therefore random number r is a number far less than N, for example, if there is a difference in terms of a predetermined order of magnitude between the values of r and N. For example, when n=2048, i=320 can be selected. In this case, the value of random number r is far less than the value of N.

Step 106: Process to-be-encrypted data m corresponding to the target user by using public key pk and random number r, to generate homomorphic ciphertext $c=(1+N)^m \cdot (h^r \mod N)^N = (1+N)^m \cdot (h^N \mod N^2)^r \mod N^2$.

The calculation equation of homomorphic ciphertext c includes two parts: $(1+N)^m$ used to include plaintext data m and $(h^r \mod N)^N$ or $(h^N \mod N^2)^r$ used to increase ciphertext randomness. For $(h^N \mod N^2)^r$, description is provided as above: A predetermined cyclic group is selected from random number space $Z^*_N$, and size k of the predetermined cyclic group has shorter length i, so that random number r also has a shorter length. Therefore, compared with a selected random number with a length of n or the same order of magnitude, random number r with a shorter length can ensure a smaller calculation amount of $(h^N \mod N^2)^r$, and therefore encryption efficiency can be significantly improved when same data m is encrypted. In particular, in a scenario in which an encryption operation is performed on a large amount of data, for example, in a blockchain network, processing efficiency of a confidential transaction can be significantly improved. For another example, in a multi-party computation scenario, a calculation speed can be significantly increased.

Random number r with a very small value can be prevented from being selected by limiting the minimum value of length i, to prevent insufficient randomness of homomorphic ciphertext c from affecting security of homomorphic ciphertext c. For example, when n=2048, it is set that i≥224, in other words, the length of random number r is not less than 224 bits, and therefore sufficient randomness and security of homomorphic ciphertext c can be ensured, for example, at least 112-bit or higher security can be provided (homomorphic ciphertext c cannot be decrypted in $2^{112}$ steps).

When $(h^N \mod N^2)^r$ in the equation is calculated, modular exponentiation can be directly performed each time based on the equation, but a relatively long calculation time may be needed due to a relatively large calculation amount. Actually, after $(h^r \mod N)^N$ is converted into $(h^N \mod N^2)^r$ in the equation, it can be found that $(h^N \mod N^2)^r$ represents fixed base modular exponentiation with an exponent of i bits, in other words, a base of $(h^N \mod N^2)^r$ is fixed to $h^N \mod N^2$. Therefore, a value of $h^N \mod N^2$ can be pre-calculated based on h in public key pk, and no temporary calculation is needed.

Further, the length of random number r is fixed to i bits, and therefore each random number r can be represented as an i-bit binary string. On a basis of j bits, the i-bit binary string can be divided into i/j numerical segments $r\_0, r\_1, \ldots,$ and $r\_[(i/j)-1]$, which can be uniformly represented as $r\_u$, where $u \in [0, (i/j)-1]$. Assume that these numerical segments can be sequentially arranged as $r\_0, r\_1, \ldots,$ and $r\_[(i/j)-1]$ in an ascending order. In this case, each random number r can be represented as $\Sigma r\_u \cdot 2^{ju} = r\_0 + r\_1 \cdot 2^j + \ldots + r\_[(i/j)-1] \cdot 2^{j[(i/j)-1]}$, and a value of any numerical segment $r\_u$ belongs to $[0, 2^{j}-1]$. Therefore, $(h^{N \mod N}_2)^r$ can be divided into $(h^N \mod N^2)^{r\_0} \cdot (h^N \mod N^2)^{r\_1 \cdot 2^j} \cdot \ldots \cdot (h^N \mod N^2)^{r\_[(i/j)-1] \cdot 2^{j[(i/j)-1]}}$, and can be further converted into $(h^N \mod N^2)^{r\_0} \cdot [h^N \mod N^2)^{2^j}]^{r\_1} \cdot \ldots \cdot [h^N \mod N^2)^{2^{j[(i/j)-1]}}]^{r\_[(i/j)-1]}$. For example, j=8 or another value can be selected.

Then, values of $h^N \mod N^2$, $(h^N \mod N^2)^{2^j}, \ldots,$ and $(h^N \mod N^2)^{2^{j[(i/j)-1]}}$ can be pre-calculated, and then after actually selected random number r is divided, further calculation is performed with reference to the pre-calculated values. Alternatively, the value of each of numerical segments $r\_0, r\_1, \ldots,$ and $r\_[(i/j)-1]$ obtained after random number r is divided belongs to $[0, 2^j-1]$, and therefore values of $(h^N \mod N^2)^0$ to $(h^N \mod N^2)^{2^j-1}$, $[(h^N \mod N^2)^{2^j}]^0$ to $[h^N \mod N^2)^{2^j}]^{2^j-1}, \ldots,$ and $[(h^N \mod N^2)^{2^{j[(i/j)-1]}}]^0$ to $[(h^N \mod N^2)^{2^{j[(i/j)-1]}}]^{2^j-1}$ can be pre-calculated. In this case, after actually seclected random number r is divided, for example, when i/j numerical segments $r_u$ are obtained through division and $u \in [0, (i/j)-1]$, corresponding pre-calculated values can be selected based on values of the numerical segments, and then without involving modular exponentiation, these values are multiplied to calculate $(h^N \mod N^2)^r$ or to further process $(h^N \mod N^2)^r$ into $[(h^N \mod N^2)^r \mod N^2]$, thereby improving calculation efficiency.

For example, if the numerical segments obtained after actually selected random number r is divided are $r_0, r_1, \ldots,$ and $r_{(i/j)-1}$, in other words, $r = r_0 + r_1 \cdot 2^j + \ldots + r_{(i/j)-1} \cdot 2^{j[(i/j)-1]}$, based on a value list formed by pre-calculated $(h^N \mod N^2)^0$ to $(h^N \mod N^2)^{2^j-1}$, $[(h^N \mod N^2)^{2^j}]^0$ to $[(h^N \mod N^2)^{2^j}]^{2^j-1}, \ldots,$ and $[(h^N \mod N^2)^{2^{j[(i/j)-1]}}]^0$ to $[(h^N \mod N^2)^{2^{j[(i/j)-1]}}]^{2^j-1}$, values of $(h^N \mod N^2)^{r_0}$, $[(h^N \mod N^2)^{2^j}]^{r_1}, \ldots,$ and $[(h^N \mod N^2)^{2^{j[(i/j)-1]}}]^{r_{(i/j)-1}}$ (namely, values of $(h^N \mod N^2)^{2^{ju}}$ raised to the power of $r_u$) can be directly determined from the value list, and then these values are multiplied to obtain $(h^N \bmod N^2)^r$ or to further process $(h^N \bmod N^2)^r$ into $[(h^N \bmod N^2)^r \bmod N^2]$.

Finally, homomorphic ciphertext c can be further generated with reference to the calculated value of $(1+N)^m$ and the value of $[(h^N \bmod N^2)^r \bmod N^2]$.

Step 108: Provide homomorphic ciphertext c to the target user, where homomorphic ciphertext c can be decrypted by the target user by using private key sk to obtain data m, a value of private key sk is $\alpha = a \cdot k$, and a is a predetermined non-zero value.

Figure 2:
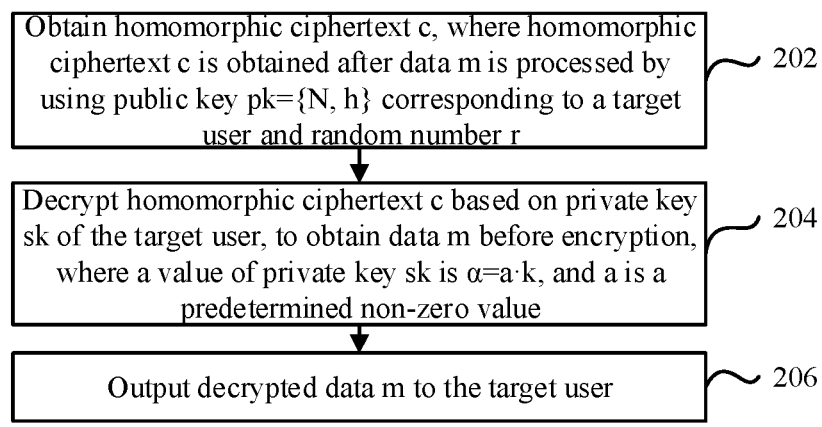
FIG. 2 is a flowchart illustrating a homomorphic data decryption method for implementing privacy protection, according to an example implementation.

Correspondingly, FIG. 2 is a flowchart illustrating a homomorphic data decryption method for implementing privacy protection, according to an example implementation. As shown in FIG. 2, the method is applied to a computing device, and can include the following steps.

Step 202: Obtain homomorphic ciphertext $c = (1+N)^m \cdot (h^r \bmod N)^N = (1+N)^m \cdot (h^N \bmod N^2)^r \bmod N^2$, where homomorphic ciphertext c is obtained after data m is processed by using public key pk={N, h} corresponding to a target user and random number r.

In the equation, h is a generator of a predetermined cyclic group with a size of k in random number space $Z^*_N$, $h^r$ belongs to the predetermined cyclic group, a length of k is i bits, a length of N is n bits, and i<<n. For a generation process of public key pk, selection of random number r, and an encryption process of data m, references can be made to the implementation shown in FIG. 1. Details are omitted here for simplicity.

Step 204: Decrypt homomorphic ciphertext c based on private key sk of the target user, to obtain data $$m = \frac{c^k \bmod N^2 - 1}{N} \cdot k^{-1} \bmod N$$

before encryption, where a value of private key sk is $\alpha = a \cdot k$, and a is a predetermined non-zero value.

When a value of homomorphic ciphertext c satisfies $c = (1+N)^m \cdot (h^N \bmod N^2)^r \bmod N^2$, decryption based on private key sk can be performed as follows: First, size k of the predetermined cyclic group is calculated based on value a of private key sk; and then k-exponentiation is performed on both sides of the calculation equation of homomorphic ciphertext c, to obtain $c^k = (1+N)^{km} \cdot (h^N \bmod N^2)^{rk} \bmod N^2 = (1+N)^{km} \cdot [(h^k)^N \bmod N^2]^r \bmod N^2$. As described above, h is the generator of the predetermined cyclic group, and the size of the predetermined cyclic group is k, and therefore $h^k = h^0 = 1$. Therefore, the equation can be further converted into $c^k = (1+N)^{km} \bmod N^2 = 1 + km \cdot N \bmod N^2$. In this case, $$m = \frac{c^k \bmod N^2 - 1}{N} \cdot k^{-1} \bmod N$$

can be calculated.

It can be seen that value $\alpha$ of private key sk is related to size k of the predetermined cyclic group. Therefore, when the target user performs k-exponentiation on both sides of the equation of homomorphic ciphertext c based on private key sk, random number part $(h^N \bmod N^2)^r$ can be eliminated, and only a conversion process between c and m is left, so that data m can be successfully decrypted.

Step 206: Output decrypted data m to the target user.

The target user can perform the homomorphic decryption operation on the held computing device, and output decrypted data m to the target user. Alternatively, the target user can transmit homomorphic ciphertext c to a certain non-local computing device such as a cloud device, and the computing device is trusted by the target user, can store or temporarily obtain private key sk of the target user, to decrypt homomorphic ciphertext c, and then output and return decrypted data m to the target user.

As described above, by selecting a public and private key pair that satisfies a certain condition, data m can be encrypted into corresponding homomorphic ciphertext c according to the implementation described in FIG. 1, and homomorphic ciphertext c can be decrypted into corresponding data m according to the implementation described in FIG. 2. The following describes, with reference to an implementation by using an example, how to select a public and private key pair that satisfies the previous condition.

First, number N is determined. A value of N can be a product of two large prime numbers P and Q, so that it is difficult to obtain values of P and Q. A length P and Q can be 1024 bits. In this case, a length of $N = P \cdot Q$ is 2048 bits, namely, the previous parameter n=2048. Certainly, another length can be used in another implementation. Implementations are not limited in the present specification. When the length of N is large enough, there is a very low probability that the values of P and Q are obtained. Therefore, when a public and private key pair is generated based on the values of P and Q, it can be ensured that it is difficult to obtain values of public and private keys, which features high security. Length n of N can be first determined, then prime numbers P and Q with a length of (n/2) are selected, and it is ensured that $P \equiv Q \equiv 3 \bmod 4$ and $\gcd(P-1, Q-1) = 2$ (in other words, the greatest common divisor of P−1 and Q−1 is 2) are satisfied. In this case, $N = P \cdot Q$ is calculated.

Message space $Z_N$ can be obtained based on determined number N, and message space $Z_N$ includes elements $\{0, \ldots, N-1\}$. Random number space $Z^*_N$ can be determined based on message space $Z_N$, and elements included in random number space $Z^*_N$ are all elements that are in message space $Z_N$ and relatively prime to N. Because $N = P \cdot Q$, it can be determined that the size (namely, the number of elements included) of random number space $Z^*_N$ is $(P-1)(Q-1)$.

Random number space $Z^*_N$ includes the following subgroups: quadratic residue group $QR_N$ and group $\langle -1 \rangle$. Elements included in quadratic residue group $QR_N$ are elements that are in random number space $Z^*_N$ and raised to the power of 2, in other words, $QR_N = \{y^2 \bmod N | y \in Z^*_N\}$, and a size of quadratic residue group $QR_N$ is $(P-1)(Q-1)/4$.

Group $\langle -1 \rangle$ is a second-order cyclic group generated by element $(-1 \bmod N)$, group $\langle -1 \rangle$ includes elements $\{-1 \bmod N, 1 \bmod N\}$, in other words, a size of group $\langle -1 \rangle$ is 2.

Further, quadratic residue group $QR_N$ includes the following subgroups: group $QR_N^\alpha$ and group $QR_N^\beta$. Quadratic residue group $QR_N$ is an internal direct product of group $QR_N^\alpha$ and group $QR_N^\beta$ ($QR_N^\alpha \otimes QR_N^\beta = QR_N$), in other words, $|QR_N^\alpha| |QR_N^\beta| = |QR_N|$, where $|QR_N^\alpha|$ represents a size of group $QR_N^\alpha$, $|QR_N^\alpha|$, $|QR_N^\beta|$ represents a size of group $QR_N^\beta$, and $|QR_N|$ represents the size of quadratic residue group $QR_N$. It is known that $|QR_N| = (P-1)(Q-1)/4$, and therefore values of $|QR_N^\alpha|$ and $|QR_N^\beta|$ can be set based on this, so that $|QR_N^\alpha| |QR_N^\beta| = |QR_N|$ can be satisfied. Group $QR_N^\alpha$ represents a set formed by all elements that are in group $QR_N$ and raised to the power of $\alpha$, and group $QR_N^\beta$ represents a set formed by all elements that are in group $QR_N$ and raised to the power of $\beta$, in other words, $QR_N^\alpha = \{y^{2\alpha} \mod N | y \in Z^*_N\}$, and $QR_N^\alpha = \{y^{2\beta} \mod N | y \in Z^*_N\}$.

Therefore, an internal direct product of group $QR_N^\beta$ and group $\langle -1 \rangle$ constitutes the predetermined cyclic group. For example, the predetermined cyclic group can be represented as $QR_N^\beta \otimes \langle -1 \langle$. By setting $QR_N^\beta|=\alpha$, it can be determined that the size of the predetermined cyclic group is $k=2\alpha$ with reference to the size of group $\langle -1 \rangle$ being 2. Therefore, when private key $sk=\alpha=a \cdot k$ is satisfied, $a=\alpha/k=1/2$ can be determined.

The value of $\alpha$ is used as private key sk, and therefore it needs to ensure that the value of $\alpha$ cannot be obtained or is difficult to obtain, to ensure security of $\alpha$. As described above, number N included in the public key is the product of prime numbers P and Q, and the values of prime numbers P and Q are difficult to obtain. Therefore, $\alpha$ can be calculated based on the values of prime numbers P and Q. For example, intermediate parameters p and q can be used. Intermediate parameters p and q are prime numbers, p|P-1, and Q-1 (in other words, p is divisible by P-1, and q is divisible by Q-1). In this case, $\alpha=pq$ can be set. In addition, $\beta=(P-1)(Q-1)/(4pq)$ can be set, and $\gcd(\alpha, \beta)=1$ is satisfied. In this case, $a \cdot \beta=(P-1)(Q-1)/4=|QR_N|$ can be determined. It can be seen that $|QR_N^\alpha|=\beta$ with reference to $QR_N^\alpha||QR_N^\beta|=|QR_N|$ and $|QR_N^\beta|=\alpha$.

As described above, generator h of selected predetermined cyclic group $QR_N^{\beta \otimes} \langle -1 \rangle$ can be represented as $h=-y^{2\beta} \mod N$, where $y \in Z^*_N$. The size of predetermined cyclic group $QR_N^{\beta \otimes} \langle -1 \rangle$ is $2\beta$, and therefore the elements included in predetermined cyclic group $QR_N^{\beta \otimes} \langle -1 \rangle$ are $\{h^0, h^1, h^2, \ldots, h^{2\alpha-1}\}$. In a subsequent encryption process, random number r needs to be selected, so that hr belongs to predetermined cyclic group $QR_N^\beta, \otimes \langle -1 \rangle$. Therefore, a value of random number r belongs to $[0, 2\alpha-1]$, in other words, a length of random number r is related to a length of $\alpha$.

When data m is encrypted based on public key pk, a calculation equation used is $c=(1+N)^m \cdot (h^N \mod N^2)^r \mod N^2$ where random number r is used as an exponent of modular exponentiation. Therefore, the length of random number r needs to be controlled, to reduce modular exponentiation complexity. For example, when the length of N is n=2048 bits, it can be set that the length of random number r is i=320 bits, and therefore the length of $\alpha$ is also 320 bits. In addition, $\alpha=pq$, and therefore the length of each of intermediate parameters p and q can be 160 bits, to ensure that the calculated length of $\alpha$ is 320 bits.

Based on the previously described content, in the technical solutions in the present specification, when public and private keys are determined, random number space $Z^*_N$, the subgroups of random number space $Z^*_N$, namely, quadratic residue group $QR_N$ and group $\langle -1 \rangle$, and the subgroups of quadratic residue group $QR_N$, namely, group $QR_N^\alpha$ and group $QR_N^\beta$, are actually involved. In these groups, group $QR_N^\beta$ and group $\langle -1 \rangle$ are selected to constitute predetermined cyclic group $QR_N^\beta \otimes \langle -1 \rangle$ in the present specification, and the size $(2\alpha)$ of predetermined cyclic group $QR_N^\beta \otimes \langle -1 \rangle$ is related to the length of random number r. In other words, predetermined cyclic group $QR_N^\beta \otimes \langle -1 \rangle$ of an appropriate size is selected, so that random number r with an appropriate length can be selected in the encryption calculation process, to strike a balance between encryption efficiency and security (a longer length of random number r indicates lower encryption efficiency and higher security; and on the contrary, a shorter length of random number r indicates higher encryption efficiency and lower security).

Figure 3:
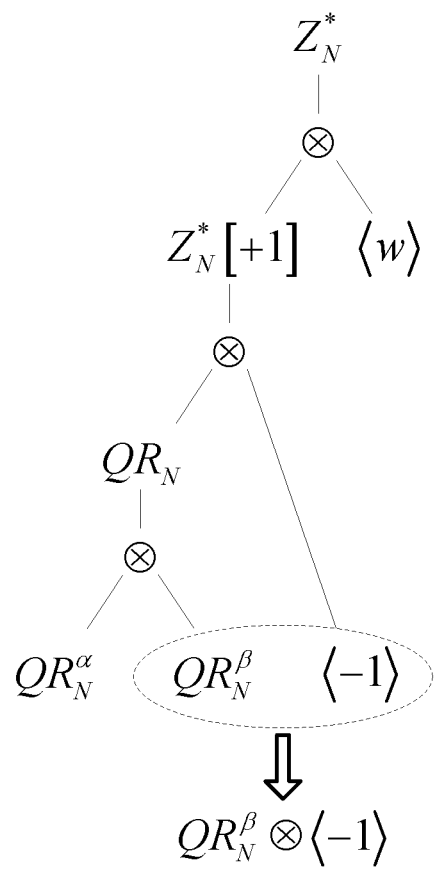
FIG. 3 is a schematic diagram illustrating random number space $Z^*_N$, according to an example implementation.

Actually, random number space $Z^*_N$ further includes other subgroups. For example, FIG. 3 is a schematic diagram illustrating random number space $Z^*_N$, according to an example implementation. As shown in FIG. 3, in addition to the previous subgroups, random number space $Z^*_N$ can include other subgroups such as group $Z^*_N[+1]$ and group $\langle w \rangle$. However, encryption efficiency can be low when a predetermined cyclic group is formed based on these subgroups. Group $Z^*_N[+1]$ represents a set formed by all elements whose Jacobi symbols are +1 in random number space $Z^*_N$, in other words, $$Z^*_N[+1] = \left\{ y \mid y \in Z^*_N, \left(\frac{y}{N}\right) = +1 \right\}.$$

Group $\langle w \rangle$ represents a second-order cyclic group generated by certain element w whose Jacobi symbol is −1 and order is 2 in random number space $Z^*_N$, in other words, $\langle w \rangle = \{w \mod N, 1 \mod N\}$.

Group $Z^*_N[+1]$ is used as an example. A size of group $Z^*_N[+1]$ is $(P-1)(Q-1)/2$, in other words, $|Z^*_N[+1]|=(P-1)(Q-1)/2$. If group $Z^*_N[+1]$ is used as the predetermined cyclic group or the predetermined cyclic group is generated based on group $Z^*_N[+1]$, when corresponding random number r is determined, the length of random number r is related to size $(P-1)(Q-1)/2$ of group $Z^*_N[+1]$. For example, when the length of each of P and Q is 1024 bits, the length of random number r is 2048 bits, which is far greater than random number r that is with a length of 320 bits and selected based on $QR_N^\beta \otimes \langle -1 \rangle$. Therefore, encryption calculation complexity is improved, and encryption efficiency is lowered. Similarly, as described above, the size of group $Q^R N$ is $(P-1)(Q-1)/4$. If group $QR_N$ is used as the predetermined cyclic group or the predetermined cyclic group is generated based on group $QR_N$, it is determined that the length of random number r is related to size $(P-1)(Q-1)/4$ of group $QR_N$. For example, when the length of each of P and Q is 1024 bits, the length of random number r is 2048 bits. Therefore, in the present specification, group $QR_N$ is further divided to obtain groups $QR_N^\beta$ with a size of $\alpha$, to constitute predetermined cyclic group $QR_N^\beta \otimes \langle -1 \rangle$ based on group $QR_N^\beta$.

The homomorphic encryption/decryption solutions in the present specification can be applied to many application scenarios. The following provides description by using examples.

The homomorphic encryption/decryption solutions can be applied to a blockchain transaction, to implement a confidential transaction in a blockchain network. For example, the target user can create a blockchain transaction between the target user and transaction objects Q_0 to Q_t based on transfer amounts $m_0$ to $m_t$ respectively corresponding to transaction objects Q_0 to Q_t. The blockchain transaction includes homomorphic ciphertext $c_0$ to $c_t$ respectively corresponding to transfer amounts mo to mt, where t≥0, and account balances of the target user and transaction objects Q_0 to Q_t are respectively recorded as corresponding homomorphic ciphertext d and d_0 to d_t in a blockchain ledger. Then, the target user can submit the blockchain transaction to the blockchain network. After the blockchain transaction is completed, for homomorphic ciphertext d and d_0, . . . , and d_t recorded in the blockchain ledger, d is decreased by $(c_0+ \ldots +c_t)$, d_0 is decreased by $c_0$, . . . , and d_t is decreased by $c_t$.

Figure 4:
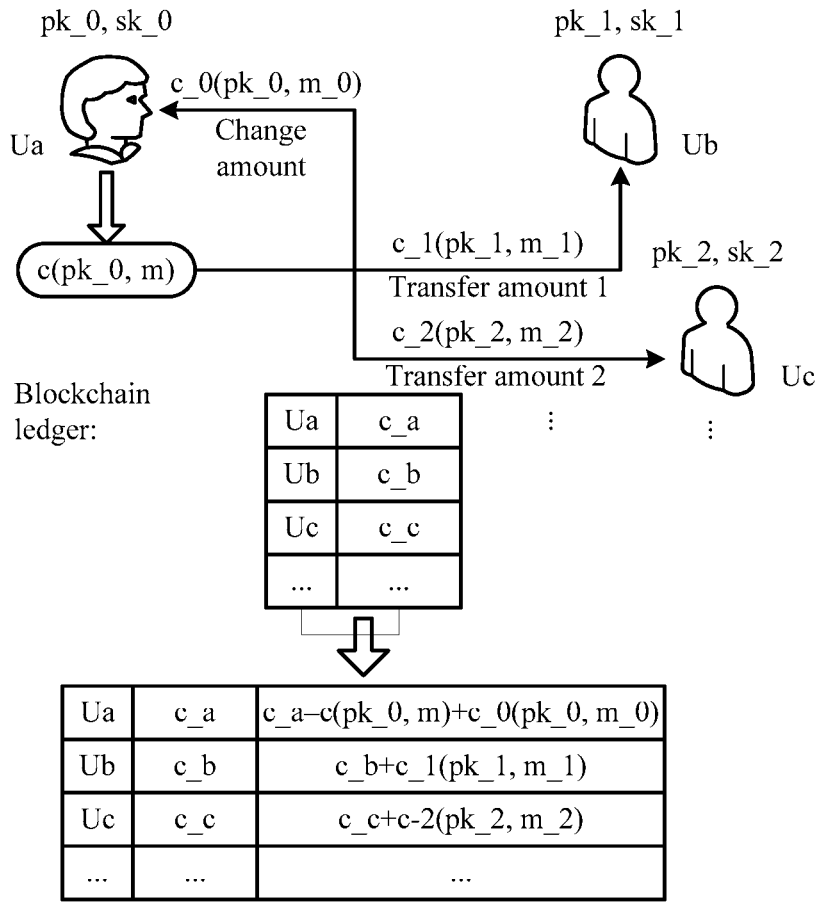
FIG. 4 is a schematic diagram illustrating implementing a confidential transaction in a blockchain network, according to an example implementation.

FIG. 4 is a schematic diagram illustrating implementing a confidential transaction in a blockchain network, according to an example implementation. As shown in FIG. 4, assume that the target user is user Ua, and transaction objects are users Ub, Uc, etc. User Ua corresponds to a unique public and private key pair (pk_0, sk_0), namely, public key pk_0 and private key sk_O. Similarly, user Ub corresponds to a unique public and private key pair (pk_1, sk_1), user Uc corresponds to a unique public and private key pair (pk_2, sk_2), and so on.

An account balance corresponding to each user is recorded in the blockchain ledger in the form of homomorphic ciphertext corresponding to the account balance. For example, an account balance of user Ua is m_a, m_a is actually encrypted by using the homomorphic encryption solutions in the present specification to generate corresponding homomorphic ciphertext c_a, and homomorphic ciphertext c_a is recorded in the blockchain ledger. Similarly, homomorphic ciphertext c_b corresponding to account balance m_b of user Ub, homomorphic ciphertext c_c corresponding to account balance m_c of user Uc, etc. are recorded in the blockchain ledger. Although data in the blockchain ledger can be publicly queried, each user can decrypt only homomorphic ciphertext corresponding to the user by using a key, and cannot decrypt homomorphic ciphertext corresponding to another user. Therefore, each user can learn only an account balance of the user, and cannot learn an account balance of the another user.

Assume that user Ua initiates a blockchain transaction, and in the blockchain transaction, transfer amount 1 that needs to be transferred from user Ua to user Ub is m_1, transfer amount 2 that needs to be transferred from user Ua to user Uc is m 2, and so on. Assume that user Ua selects an asset with value of m from an account, completes the blockchain transaction by using the asset, and can learn that the remaining change amount is m_0 after transferring the asset to users Ub, Uc, etc. In this case, it can be determined that the input of the blockchain transaction is the asset with value of m, and the outputs are m_0 transferred to user Ua, m_1 transferred to user Ub, m_2 transferred to the Uc, etc. In this case, users Ua, Ub, Uc, etc. are previous transaction objects Q_0 to Q_t.

The asset with value of m belongs to user Ua, and the value of the asset is recorded in the blockchain ledger as corresponding homomorphic ciphertext c(pk_0, m), which indicates that homomorphic ciphertext c is obtained after homomorphic encryption is performed on the asset with value of m by using public key pk_0 of user Ua. In addition, user Ua needs to perform homomorphic encryption for each output of the blockchain transaction, and a public key used during encryption corresponds to an output target object. For example, change amount m_0 needs to be output to user Ua, and therefore amount m_0 needs to be encrypted by using public key pk 0 of user Ua to generate homomorphic ciphertext c_0(pk_0, m_0); transfer amount 1, namely, m_1, needs to be output to user Ub, and therefore amount m_1 needs to be encrypted by using public key pk_1 of user Ub to generate homomorphic ciphertext c_l(pk_1, m_1); and transfer amount 2, namely, m_2, needs to be output to user Uc, and therefore amount m_2 needs to be encrypted by using public key pk_2 of user Uc to generate homomorphic ciphertext c_2(pk_2, m_2). Certainly, other content, proof information, etc. needed by the transaction can be further included in the blockchain transaction. Implementations are omitted here for simplicity.

Then, after user Ua submits the blockchain transaction to the blockchain network, each blockchain node in the blockchain network can execute the blockchain transaction in the blockchain network after completing consensus processing on the blockchain transaction. Correspondingly, the account balance of each user recorded in the blockchain ledger changes accordingly. User Ua takes out the asset with value of m and receives the change amount in the blockchain transaction, and therefore asset c_a in the blockchain ledger is updated to [c_a—c(pk_0, m)+c_0(pk_0, m_0)] (if an addition/subtraction operation of plaintext data corresponds to a multiplication/division operation of homomorphic ciphertext, c_a is updated to [c_a±c(pk_0, m)×c_0(pk_0, m_0)]). An additive homomorphism feature is satisfied because c_a, c(pk_0, m), and c_0(pk_0, m_0) are all generated by performing encryption by using public key pk 0 of user Ua. Therefore, a value obtained after user Ua decrypts [c_a-c(pk_0, m)+c_0(pk_0, m_0)] (or [c_a±c(pk_0, m)×c_0 (pk_0, m_0)]) by using corresponding private key sk_0 is equal to (m_a—m+m_0). Similarly, user Ub receives transfer amount 1 in the blockchain transaction, and therefore asset c_b in the blockchain ledger is updated to [c_b+c_1 (pk_1, m_1) (if an addition/subtraction operation of plaintext data corresponds to a multiplication/division operation of homomorphic ciphertext, c_b is updated to [c_b×c_1 (pk_1, m_1)]), and decryption can be performed by using private key sk_1, and an obtained value is equal to (m_b+ m_1). User Uc receives transfer amount 2 in the blockchain transaction, and therefore asset c_c in the blockchain ledger is updated to [c_c+c_2(pk_2, m_2)] (if an addition/subtraction operation of plaintext data corresponds to a multiplication/division operation of homomorphic ciphertext, c_c is updated to [c_c×c_2(pk_2, m_2)]), and decryption can be performed by using private key sk_2, and an obtained value is equal to (m_c+m_2).

It can be seen that based on the homomorphic encryption/decryption solutions in the present specification, it can be ensured that an account balance of a user, a transaction amount of a blockchain transaction, etc. are kept private, and each amount can be correctly calculated and maintained based on the homomorphic feature, thereby implementing a confidential transaction in a blockchain network scenario. In addition, especially when a blockchain transaction involves a plurality of transaction objects or a large quantity of blockchain transactions are involved, based on the homomorphic encryption/decryption solutions in the present specification, an execution speed of each encryption/decryption operation can be increased while security is ensured, which helps improve transaction efficiency in a blockchain network.

The previous homomorphic encryption/decryption solutions can be applied to a multi-party computation scenario, to implement secure interaction in the multi-party computation scenario. For example, the target user can send homomorphic ciphertext co to cs respectively corresponding to data mo to ms to a specified user, so that the specified user can perform predetermined operation f( ) that satisfies additive homomorphism on homomorphic ciphertext $c_0$ to $c_s$. In addition, operation result $f(c_0\text{-}c_s)$ returned by the specified user can be decrypted by using private key sk, and a value obtained after the decryption is $f(m_0\text{-}m_s)$.

Figure 5:
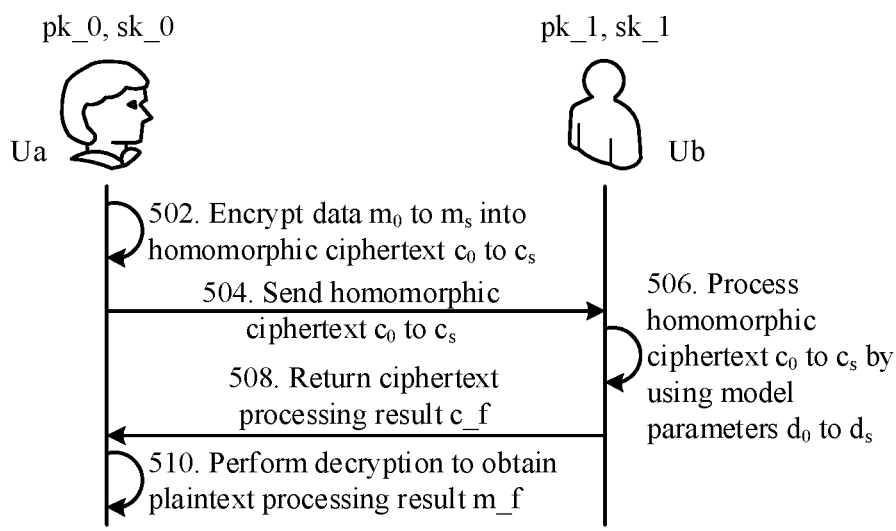
FIG. 5 is a schematic interaction diagram illustrating a multi-party computation scenario, according to an example implementation.

FIG. 5 is a schematic interaction diagram illustrating a multi-party computation scenario, according to an example implementation. As shown in FIG. 5, user Ua and user Ub are still used as examples. User Ua corresponds to public and private key pair (pk_0, sk_0), and user Ub corresponds to public and private key pair (pk_1, sk_1). An interaction process between the two users can include the following steps.

Step 502: User Ua encrypts data mo to ms into homomorphic ciphertext $c_0$ to $c_s$.

User Ua performs homomorphic encryption processing on data $m_0$ to $m_s$ based on the implementation shown in FIG. 1 by using public key pk_0 corresponding to user Ua, to generate corresponding homomorphic ciphertext $c_0$ to $c_s$. A specific calculation equation and an encryption process are omitted here for simplicity.

Step 504: User Ua sends homomorphic ciphertext $c_0$ to $c_s$ to user Ub.

User Ua sends only homomorphic ciphertext $c_0$ to $c_s$ to user Ub, and does not need to send raw plaintext data $m_0$ to $m_s$, and user Ub does not hold private key sk_0 corresponding to public key pk_0 used for encryption, and therefore data $m_0$ to $m_s$ is not exposed to user Ub.

Step 506: User Ub processes homomorphic ciphertext $c_0$ to $c_s$ by using model parameters $d_0$ to $d_s$.

Step 508: User Ub returns ciphertext processing result c_f to user Ua.

Assume that user Ub obtains a group of model parameters $d_0$ to $d_s$ of a data processing model through training by using a method such as big data analysis or artificial intelligence, but user Ub does not want to expose the group of model parameters $d_0$ to $d_s$ to another user. Therefore, after processing homomorphic ciphertext $c_0$ to $c_s$ by using the group of model parameters $d_0$ to $d_s$, user Ub returns only obtained ciphertext processing result c_f to user Ua. As such, homomorphic ciphertext co to cs can be processed by using model parameters do to ds, and exposure of information such as specific values of model parameters do to ds can be avoided.

When homomorphic ciphertext co to cs is processed by using the group of model parameters do to ds, the processing process should satisfy the additive homomorphism feature. To be specific, a multiplication/division operation can be performed between each piece of homomorphic ciphertext and a corresponding parameter, and an addition/subtraction operation instead of a multiplication/division operation should be performed between homomorphic ciphertext. For example, a processing method of the data processing model can be $c_0 \times d_0 + c_1 \times d_1 + \ldots + c_s \times d_s$. Certainly, if an addition/subtraction operation of plaintext data corresponds to a multiplication/division operation of homomorphic ciphertext, the processing method of the data processing model can be $C_0^{d0} \times c_1^{d1} \times \ldots \times C_s^{ds}$.

Step 510: User Ua decrypts ciphertext processing result c_f to obtain plaintext processing result m_f.

Based on the additive homomorphism feature, after processing homomorphic ciphertext $c_0$ to $c_s$ by using model parameters $d_0$ to $d_s$, user Ub decrypts ciphertext processing result c_f by using private key sk_0, and obtained plaintext processing result m_f is equivalent to a result obtained after data mo to ms is processed by using model parameters $d_0$ to $d_s$.

Therefore, based on the homomorphic encryption/decryption solutions in the present specification, in the multi-party computation scenario involving user Ua and user Ub, it can be ensured that data $m_0$ to $m_s$ held by user Ua is not exposed to user Ub and model parameters do to ds held by user Ub are not exposed to user Ua, and user Ua can finally obtain result m_f obtained after data $m_0$ to $m_s$ is processed by using model parameters $d_0$ to $d_s$. In addition, especially in a case in which homomorphic encryption is performed on a large amount of data, based on the homomorphic encryption/decryption solutions in the present specification, an encryption/decryption speed can be significantly increased, thereby improving multi-party computation efficiency.

Figure 6:
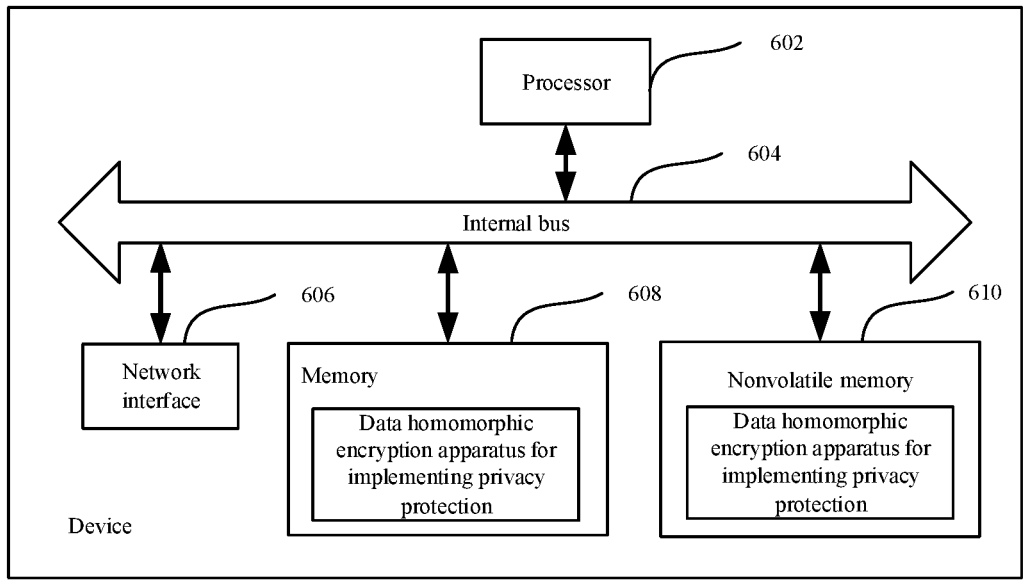
FIG. 6 is a schematic structural diagram of a device, according to an example implementation.

FIG. 6 is a schematic structural diagram of a device, according to an example implementation. Referring to FIG. 6, in terms of hardware, the device includes a processor 602, an internal bus 604, a network interface 606, a memory 608, and a nonvolatile memory 610, and certainly can further include hardware needed by other services. The processor 602 reads a corresponding computer program from the nonvolatile memory 610 into the memory 608 and then runs the corresponding computer program, to logically form a homomorphic data encryption apparatus for implementing privacy protection. Certainly, in addition to a software implementation, one or more implementations of the present specification do not exclude another implementation, for example, a logic device or a combination of hardware and software. That is, an execution body of the following processing procedure is not limited to each logical unit, and can be hardware or a logic device.

Figure 7:
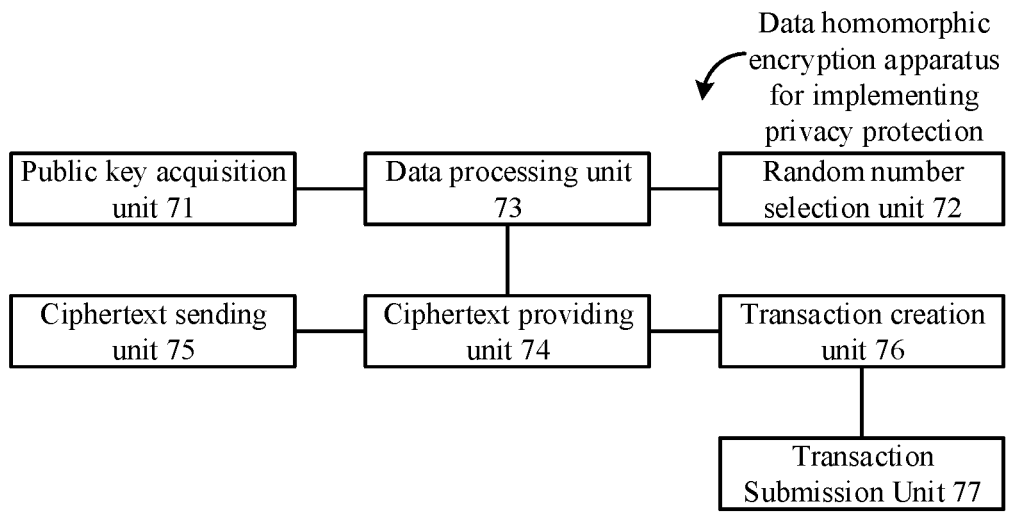
FIG. 7 is a block diagram illustrating a homomorphic data encryption apparatus for implementing privacy protection, according to an example implementation.

Referring to FIG. 7, in the software implementation, the homomorphic data encryption apparatus for implementing privacy protection can include the following: a public key acquisition unit 71, configured to obtain public key pk={N, h} corresponding to a target user, where h is a generator of a predetermined cyclic group with a size of k in random number space $Z^*_N$, a length of k is i bits, a length of N is n bits, and i<<n; a random number selection unit 72, configured to select random number r, so that $h^r$ belongs to the predetermined cyclic group; a data processing unit 73, configured to process to-be-encrypted data m corresponding to the target user by using public key pk and random number r, to generate homomorphic ciphertext $c=(1+N)^m \cdot (h^r \mod N)^N = (1+N^2)^m \cdot (h^N \mod N^2)^r \mod N^2$; and a ciphertext providing unit 74, configured to provide homomorphic ciphertext c to the target user, where homomorphic ciphertext c can be decrypted by the target user by using private key sk to obtain data m, a value of private key sk is $\alpha = a \cdot k$, and a is a predetermined non-zero value.

Optionally, quadratic residue group $QR_N$ of random number space $Z^*_N$ is an internal direct product of group $QR_N^\alpha$ and group $QR_N^\beta$, $QR_N^\beta = \beta$, the predetermined cyclic group is an internal direct product of group $QR_N^\beta$ and group $\langle -1 \rangle$, group $\langle -1 \rangle$ is a second-order cyclic group generated by element (−1 mod N) in random number space $Z^*_N$, and a=1/2.

Optionally, when N=P·Q, P and Q are prime numbers with a length of n/2 bits, P≡Q≡3 mod 4, and gcd(P−1, Q−1)=2, it is satisfied that α=pq, β=(P−1)(Q−1)/(4pq), gcd(α, β)=1, p|(P−1), q|(Q−1), and p and q are prime numbers with a length of i/2 bits.

Optionally, $h=-y^{2\beta}$ mod N, where y belongs to random number space $Z^{*N}$.

Optionally, the data processing unit 73 is configured to: divide random number r on a basis of j bits, to obtain i/j numerical segments $r_u$, where $u \in [0, (i/j)-1]$; query a $(h^N \bmod N^2)$ pre-generated value list, where the value list includes a value of $(h^N \bmod N^2)$ raised to the power of $(2^{ju} \cdot v)$, and $v \in [0, 2^j-1]$; and generate $[(h^N \bmod N^2)^r \bmod N^2]$ through combination based on an identified value of $(h^N \bmod N^2)$ raised to the power of $r_u$, to generate homomorphic ciphertext c.

Optionally, n=2048, and 224≤i<n.

Optionally, the apparatus further includes the following: a ciphertext sending unit 75, configured to send homomorphic ciphertext $c_0$ to $c_s$ respectively corresponding to data $m_0$ to $m_s$ to a specified user, so that the specified user performs predetermined operation f( ) that satisfies additive homomorphism on homomorphic ciphertext $c_0$ to $c_s$, where operation result $f(c_0\_c_s)$ returned by the specified user can be decrypted by using private key sk, and a value obtained after the decryption is $f(m_0-m_s)$.

Optionally, the apparatus further includes the following: a transaction creation unit 76, configured to create a blockchain transaction between the target user and transaction objects Q_0 to Q_t based on transfer amounts $m_0$ to $m_t$ respectively corresponding to transaction objects Q_0 to Q_t, where the blockchain transaction includes homomorphic ciphertext $c_0$ to $c_t$ respectively corresponding to transfer amounts $m_0$ to $m_t$, t≤0, and account balances of the target user and transaction objects Q_0 to Q_t are respectively recorded as corresponding homomorphic ciphertext d and d_0 to d_t in a blockchain ledger; and a transaction submission unit 77, configured to submit the blockchain transaction to a blockchain network, where after the blockchain transaction is completed, for homomorphic ciphertext d, d_0, . . . , and d_t recorded in the blockchain ledger, there is an operation between d and $(c_0+ \ldots +ct)$, an operation between d_0 and $c_0$, . . . , and an operation between d_t and $c_t$, so that the account balance of the target user is decreased by $(m_0+ \ldots +m_t)$, and the account balances of transaction objects Q_0 to Q_t are respectively decreased by $c_0$ to $c_t$.

Figure 8:
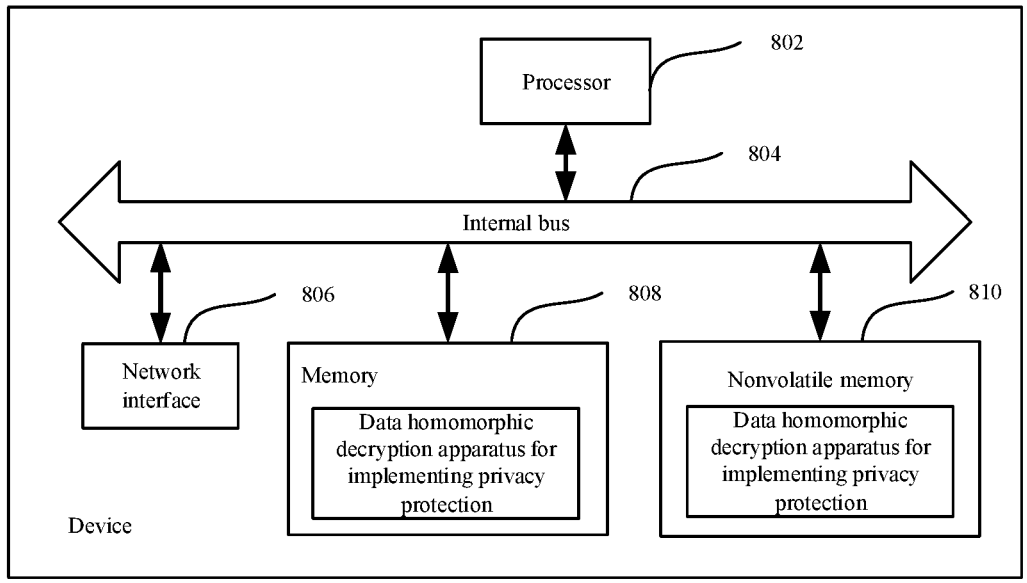
FIG. 8 is another schematic structural diagram of a device, according to an example implementation.

FIG. 8 is a schematic structural diagram of a device, according to an example implementation. Referring to FIG. 8, in terms of hardware, the device includes a processor 802, an internal bus 804, a network interface 806, a memory 808, and a nonvolatile memory 810, and certainly can further include hardware needed by other services. The processor 802 reads a corresponding computer program from the nonvolatile memory 810 into the memory 808 and then runs the corresponding computer program, to logically form a homomorphic data decryption apparatus for implementing privacy protection. Certainly, in addition to a software implementation, one or more implementations of the present specification do not exclude another implementation, for example, a logic device or a combination of hardware and software. That is, an execution body of the following processing procedure is not limited to each logical unit, and can be hardware or a logic device.

Figure 9:
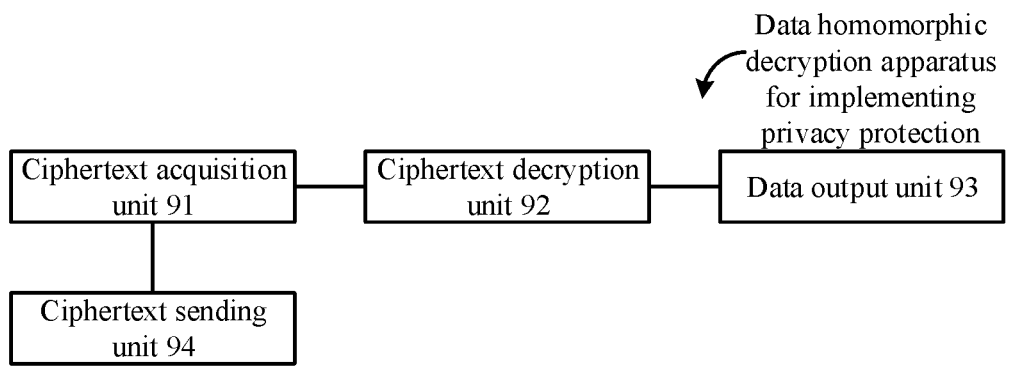
FIG. 9 is a block diagram illustrating a homomorphic data decryption apparatus for implementing privacy protection, according to an example implementation.

Referring to FIG. 9, in the software implementation, the homomorphic data decryption apparatus for implementing privacy protection can include the following: a ciphertext acquisition unit 91, configured to obtain homomorphic ciphertext $c=(1+N)^m \cdot (h^r \bmod N)^N = (1+N)^m \cdot (h^N \bmod N^2)^r \bmod N^2$, where homomorphic ciphertext c is obtained after data m is processed by using public key pk={N, h} corresponding to a target user and random number r, h is a generator of a predetermined cyclic group with a size of k in random number space $Z^*_N$, $h^r$ belongs to the predetermined cyclic group, a length of k is i bits, a length of N is n bits, and i<<n; a ciphertext decryption unit 92, configured to decrypt homomorphic ciphertext c based on private key sk of the target user, to obtain data $$m = \frac{c^k \bmod N^2 - 1}{N} \cdot k^{-1} \bmod N$$

before encryption, where a value of private key sk is $\alpha=a \cdot k$, and a is a predetermined non-zero value; and a data output unit 93, configured to output decrypted data m to the target user.

Optionally, quadratic residue group $QR_N$ of random number space $Z^*_N$ is an internal direct product of group $QR_N^\alpha$ and group $QR_N^\beta$, $QR_N^\beta = \alpha$, the predetermined cyclic group is an internal direct product of group $QR_N^\beta$ and group $\langle -1 \rangle$, group $\langle -1 \rangle$ is a second-order cyclic group generated by element (-1 mod N) in random number space $Z^*_N$, and a=1/2.

Optionally, when N=P·Q, P and Q are prime numbers with a length of n/2 bits, P≡Q≡3 mod 4, and gcd(P-1, Q-1)=2, it is satisfied that α=pq, β=(P-1)(Q-1)/(4pq), gcd(α, β)=1, p|(P-1), q|(Q-1), and p and q are prime numbers with a length of i/2 bits.

Optionally, $h=-y^{2\beta}$ mod N, where y belongs to random number space $Z^{*N}$.

Optionally, n=2048, and 224≤i<n.

Optionally, the apparatus further includes the following: a ciphertext sending unit 94, configured to send homomorphic ciphertext co to cs respectively corresponding to data $m_0$ to $m_s$ to a specified user, so that the specified user performs predetermined operation f( ) that satisfies additive homomorphism on homomorphic ciphertext $c_0$ to $c_s$; and the ciphertext decryption unit 92 is configured to receive and decrypt operation result $f(c_0-c_s)$ returned by the specified user, where a value obtained after the decryption is $f(m_0-m_s)$.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

In a typical configuration, the computer includes one or more processors (CPU), input/output interfaces, network interfaces, and memories.

The memory can include a non-persistent memory, a random access memory (RAM), a nonvolatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or other optical storage, a magnetic tape, magnetic disk storage, a quantum memory, a grapheme-based storage medium, another magnetic storage device, or any other non-transmission medium. The computer storage medium can be used to store information that can be accessed by a computing device Based on the definition in the present specification, the computer readable medium does not include transitory computer readable media (transitory media) such as a modulated data signal and carrier.

It is worthwhile to further note that the term "include", "comprise", or their any other variants is intended to cover a non-exclusive inclusion, so a process, a method, a product, or a device that includes a list of elements not only includes those elements but also includes other elements which are not expressly listed, or further includes elements inherent to such process, method, product, or device. An element described by "includes a . . . " further includes, without more constraints, another identical element in the process, method, product, or device that includes the element.

Specific implementations of the present specification are described above. Other implementations fall within the scope of the appended claims. In some situations, the actions or steps described in the claims can be performed in an order different from the order in the implementations and the desired results can still be achieved. In addition, the process depicted in the accompanying drawings does not necessarily require a particular execution order to achieve the desired results. In some implementations, multi-tasking and parallel processing can be advantageous.

The term used in the one or more implementations of the present specification is merely intended to describe a particular implementation and is not intended to limit the one or more implementations of the present specification. The terms "a" and "the" of singular forms used in the one or more implementations of the present specification and the appended claims are also intended to include plural forms, unless otherwise specified in the context clearly. It should be further understood that the term "and/or" used in the present specification indicates and includes any or all possible combinations of one or more associated listed items.

It should be understood that although terms such as "first", "second", and "third" can be used in the one or more implementations of the present specification to describe various types of information, the information is not limited to these terms. These terms are only used to distinguish between information of the same type. For example, without departing from the scope of the one or more implementations of the present specification, first information can also be referred to as second information, and similarly, the second information can be referred to as the first information. Depending on the context, for example, the word "if" used here can be explained as "while", "when", or "in response to determining".

The previous descriptions are only example implementations of the one or more implementations of the present specification, and are not intended to limit the one or more implementations of the present specification. Any modification, equivalent replacement, improvement, etc. made without departing from the spirit and principle of the one or more implementations of the present specification shall fall within the protection scope of the one or more implementations of the present specification.

What is claimed is:

1. A computer-implemented method for implementing privacy protection, comprising:
    obtaining, by a first computing device, a public key pk={N, h} corresponding to a target user, wherein h is a generator of a predetermined cyclic group with a size of k in a random number space $Z^*_N$, a length of k is i bits, a length of N is n bits, and i<<n;
    selecting, by the first computing device, random number r that makes $h^r$ belong to the predetermined cyclic group;
    processing, by the first computing device, data m corresponding to the target user using the public key pk and the random number r in generating a homomorphic ciphertext $c=(1+N)^m \cdot (h^r \mod N)^N = (1+N)^m \cdot (h^N \mod N^2)^r \mod N^2$; and
    providing, by the first computing device, the homomorphic ciphertext c to the target user, wherein the homomorphic ciphertext c is decipherable by the target user using a second computing device based on a private key sk to obtain the data m, wherein a value of the private key sk is $\alpha = a \cdot k$, and a is a predetermined non-zero value, wherein the first computing device is the same as the second computing device or the first computing device is different from the second computing device.

2. The computer-implemented method according to claim 1, wherein a quadratic residue group $QR_N$ of the random number space $Z^{*N}$ comprises an internal direct product of a group $QR_N^\alpha$ and a group $QR_N^\beta$, $QR_N^\beta = \alpha$, the predetermined cyclic group comprises an internal direct product of a group $QR_N^\beta$ and a group $\langle -1 \rangle$, wherein the group $\langle -1 \rangle$ is a second-order cyclic group generated by element ($-1 \mod N$) in the random number space $Z^{*N}$, and $a=1/2$.

3. The computer-implemented method according to claim 2, wherein if $N=P \cdot Q$, P and Q are prime numbers with a length of n/2 bits, $P \equiv Q \equiv 3 \mod 4$, and $\gcd(P-1, Q-1)=2$, it is satisfied that $\alpha=pq$, $\beta=(P-1)(Q-1)/(4pq)$, $\gcd(\alpha, \beta)=1$, $p|(P-1)$, $q|(Q-1)$, and p and q are prime numbers with a length of i/2 bits.

4. The computer-implemented method according to claim 2, wherein $h=-y^{2\beta} \mod N$ and y belongs to the random number space $Z^*_N$.

5. The computer-implemented method according to claim 1, wherein the processing data m corresponding to the target user using the public key pk and the random number r in generating homomorphic ciphertext c comprises:
    dividing the random number r on a basis of j bits, to obtain i/j numerical segments $r_u$, wherein $u \in [0, (i/j)-1]$;
    querying a pre-generated value list, wherein the pre-generated value list comprises a value of ($h^N \mod N^2$) raised to a power of ($2^{j u} \cdot v$), and $v \in [0, 2^j-1]$; and
    generating $[(h^N \mod N^2)^r \mod N^2]$ through a combination based on an identified value of ($h^N \mod N^2$) raised to a power of $r_u$, to generate the homomorphic ciphertext c.

6. The computer-implemented method according to claim 1, wherein n=2048, and 224≤i<n.

7. The computer-implemented method according to claim 1, further comprising:
    sending homomorphic ciphertext $c_0$ to $c_s$ respectively corresponding to data $m_0$ to $m_s$ to a specified user to cause the specified user to perform predetermined operation f( ) that satisfies additive homomorphism on homomorphic ciphertext $c_0$ to $c_s$, wherein an operation result $f(c_0-c_s)$ returned by the specified user is decipherable using the private key sk, and a value obtained after decryption is $f(m_0-m_s)$.

8. The computer-implemented method according to claim 1, further comprising:

creating a blockchain transaction between the target user and transaction objects Q_0 to Q_t based on transfer amounts mo to me respectively corresponding to transaction objects Q_0 to Q_t, wherein the blockchain transaction comprises homomorphic ciphertext $c_0$ to $c_t$ respectively corresponding to transfer amounts $m_0$ to $m_t$, t≥0, and account balances of the target user and transaction objects Q_0 to Q_t are respectively recorded as corresponding homomorphic ciphertext d and d_0 to d_t in a blockchain ledger; and submitting the blockchain transaction to a blockchain network, wherein after the blockchain transaction is completed, for homomorphic ciphertext d, d_0, . . . , and d_t recorded in the blockchain ledger, there is an operation between d and $(c_0+ \ldots +c_t)$, an operation between d_0 and $c_0$, . . . , and an operation between d_t and $c_t$, wherein the account balances of the target user are decreased by $(m_0+ \ldots +m_t)$, and the account balances of transaction objects Q_0 to Q_t are respectively decreased by $c_0$ to $c_t$.

9. A non-transitory, computer-readable medium storing one or more instructions executable by a computer system to perform operations for implementing privacy protection, comprising:

obtaining, by a first computing device, a public key pk={N, h} corresponding to a target user, wherein his a generator of a predetermined cyclic group with a size of k in a random number space $Z^*_N$, a length of k is i bits, a length of N is n bits, and i<<n;

selecting, by the first computing device, random number r that makes $h^r$ belong to the predetermined cyclic group;

processing, by the first computing device, data m corresponding to the target user using the public key pk and the random number r in generating a homomorphic ciphertext $c=(1+N)^m \cdot (h^r \mod N)^N - (1+N)^m \cdot (h^N \mod N^2)^r \mod N^2$; and providing, by the first computing device, the homomorphic ciphertext c to the target user, wherein the homomorphic ciphertext c is decipherable by the target user using a second computing device based on a private key sk to obtain the data m, wherein a value of the private key sk is $\alpha = a \cdot k$, and a is a predetermined non-zero value, wherein the first computing device is the same as the second computing device or the first computing device is different from the second computing device.

10. The non-transitory, computer-readable medium according to claim 9, wherein a quadratic residue group $QR_N$ of the random number space $Z^*_N$ comprises an internal direct product of a group $QR_N^\alpha$ and a group $QR_N^\beta = \alpha$, the predetermined cyclic group comprises an internal direct product of a group $QR^N$ and a group $\langle -1 \rangle$, wherein the group $\langle -1 \rangle$ is a second-order cyclic group generated by element (−1 mod N) in the random number space $Z^*_N$, and a=1/2.

11. The non-transitory, computer-readable medium according to claim 10, wherein if N=P·Q, P and Q are prime numbers with a length of n/2 bits, P≡Q≡3 mod 4, and gcd(P−1, Q−1)=2, it is satisfied that $\alpha=pq$, $\beta=(P-1)(Q-1)/(4pq)$, gcd($\alpha, \beta$)=1, p|(P−1), q|(Q−1), and p and q are prime numbers with a length of i/2 bits.

12. The non-transitory, computer-readable medium according to claim 10, wherein $h=-y^{2\beta} \mod N$, and y belongs to the random number space $Z^*_N$.

13. The non-transitory, computer-readable medium according to claim 9, wherein the processing data m corresponding to the target user using the public key pk and the random number r in generating homomorphic ciphertext c comprises:

dividing the random number r on a basis of j bits, to obtain i/j numerical segments $r_u$, wherein u ∈[0, (i/j)−1];

querying a pre-generated value list, wherein the pre-generated value list comprises a value of ($h^N \mod N^2$) raised to a power of ($2^{ju} \cdot v$), and v ∈[0, $2^j-1$]; and generating [($h^N \mod N^2)^r \mod N^2$] through a combination based on an identified value of ($h^N \mod N^2$) raised to a power of $r_u$, to generate the homomorphic ciphertext c.

14. The non-transitory, computer-readable medium according to claim 9, wherein n=2048, and 224≤i<n.

15. The non-transitory, computer-readable medium according to claim 9, wherein the operations further comprise:

sending homomorphic ciphertext co to cs respectively corresponding to data $m_0$ to $m_s$ to a specified user to cause the specified user to perform predetermined operation f( ) that satisfies additive homomorphism on homomorphic ciphertext $c_0$ to $c_s$, wherein an operation result $f(c_0-c_s)$ returned by the specified user is decipherable using the private key sk, and a value obtained after decryption is $f(m_0-m_s)$.

16. The non-transitory, computer-readable medium according to claim 9, wherein the operations further comprise:

creating a blockchain transaction between the target user and transaction objects Q_0 to Q_t based on transfer amounts $m_0$ to $m_t$ respectively corresponding to transaction objects Q_0 to Q_t, wherein the blockchain transaction comprises homomorphic ciphertext $c_0$ to $c_t$ respectively corresponding to transfer amounts $m_0$ to $m_t$, t≥0, and account balances of the target user and transaction objects Q_0 to Q_t are respectively recorded as corresponding homomorphic ciphertext d and d_0 to d_t in a blockchain ledger; and submitting the blockchain transaction to a blockchain network, wherein after the blockchain transaction is completed, for homomorphic ciphertext d, d_0, . . . , and d_t recorded in the blockchain ledger, there is an operation between d and $(c_0+ \ldots +c_t)$, an operation between d_0 and $c_0$, . . . , and an operation between d_t and $c_t$, wherein the account balances of the target user are decreased by $(m_0+ \ldots +m_t)$, and the account balances of transaction objects Q_0 to Q_t are respectively decreased by $c_0$ to $c_t$.

17. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations, comprising:

obtaining, by a first computing device, a public key pk={N, h} corresponding to a target user, wherein h is a generator of a predetermined cyclic group with a size of k in a random number space $Z^*_N$, a length of k is i bits, a length of N is n bits, and i<<n;

selecting, by the first computing device, random number r that makes $h^r$ belong to the predetermined cyclic group;

processing, by the first computing device, data m corresponding to the target user using the public key pk and the random number r in generating a homomorphic ciphertext $c=(1+N)m \cdot (h^r \bmod N)^N = (1+N)^m \cdot (h^N \bmod N^2)^r \bmod N^2$; and providing, by the first computing device, the homomorphic ciphertext c to the target user, wherein the homomorphic ciphertext c is decipherable by the target user using a second computing device based on a private key sk to obtain the data m, wherein a value of the private key sk is $\alpha = a \cdot k$, and a is a predetermined non-zero value, wherein the first computing device is the same as the second computing device or the first computing device is different from the second computing device.

18. The computer-implemented system according to claim 17, wherein a quadratic residue group $QR_N$ of the random number space $Z^*_N$ comprises an internal direct product of a group $QR_N^\alpha$ and a group $QR_N^\beta$, $QR_N^\beta = \alpha$, the predetermined cyclic group comprises an internal direct product of a group $QR_N^\beta$ and a group $\langle -1 \rangle$, wherein the group $\langle -1 \rangle$ is a second-order cyclic group generated by element (−1 mod N) in the random number space $Z^*_N$, and a=1/2.

19. The computer-implemented system according to claim 17, wherein the operations further comprise:

sending homomorphic ciphertext $c_0$ to $c_s$ respectively corresponding to data $m_0$ to $m_s$ to a specified user to cause the specified user to perform predetermined operation f( ) that satisfies additive homomorphism on homomorphic ciphertext $c_0$ to $c_s$, wherein an operation result $f(c_0 - c_s)$ returned by the specified user is decipherable using the private key sk, and a value obtained after decryption is $f(m_0 - m_s)$.

20. The computer-implemented system according to claim 17, wherein the operations further comprise:

creating a blockchain transaction between the target user and transaction objects Q_0 to Q_t based on transfer amounts $m_0$ to $m_t$ respectively corresponding to transaction objects Q_0 to Q_t, wherein the blockchain transaction comprises homomorphic ciphertext $c_0$ to $c_t$ respectively corresponding to transfer amounts $m_0$ to $m_t$, t≥0, and account balances of the target user and transaction objects Q_0 to Q_t are respectively recorded as corresponding homomorphic ciphertext d and d_0 to d_t in a blockchain ledger; and submitting the blockchain transaction to a blockchain network, wherein after the blockchain transaction is completed, for homomorphic ciphertext d, d_0, . . . , and d_t recorded in the blockchain ledger, there is an operation between d and $(c_0 + \ldots + c_t)$, an operation between d_0 and $c_0$, . . . , and an operation between d_t and $c_t$, wherein the account balances of the target user are decreased by $(m_0 + \ldots + m_t)$, and the account balances of transaction objects Q_0 to Q_t are respectively decreased by $c_0$ to $c_t$.

* * * * *

UNITED STATES PATENT AND TRADEMARK OFFICE
CERTIFICATE OF CORRECTION

PATENT NO. : 10,778,410 B2  
APPLICATION NO. : 16/783102  
DATED : September 15, 2020  
INVENTOR(S) : Shuai Han et al.

Page 1 of 1

It is certified that error appears in the above-identified patent and that said Letters Patent is hereby corrected as shown below:

In the Claims

Column 18 / Line 31 – In Claim 2, delete "$Z^*_N$" and insert -- $Z^*_N$, --, therefor.

Column 18 / Line 37 – In Claim 2, delete "$Z^*_{N,}$" and insert -- $Z^*_N$, --, therefor.

Column 18 / Line 45 – In Claim 4, after "N" insert -- , --.

Column 18 / Line 63 – In Claim 7, delete "co to cs" and insert -- $c_0$ to $c_s$ --, therefor.

Column 19 / Line 8 (Approx.) – In Claim 8, delete "mo to me" and insert -- $m_0$ to $m_t$ --, therefor.

Column 19 / Line 31 (Approx.) – In Claim 9, delete "his" and insert -- h is --, therefor.

Column 19 / Line 41 – In Claim 9, delete "$N)^N - (1+N)^m \cdot (h^N$" and insert -- $N)^N = (1+N)^m \cdot (h^N$ --, therefor.

Column 19 / Line 57 (Approx.) – In Claim 10, delete "$QR_N{}^\beta=\alpha$," and insert -- $QR_N^\beta$, $QR_N^\beta=\alpha$, --, therefor.

Column 19 / Line 59 – In Claim 10, delete "$QR^N$" and insert -- $QR_N^\beta$ --, therefor.

Column 20 / Line 24 – In Claim 15, delete "co to cs" and insert -- $c_0$ to $c_s$ --, therefor.

Column 21 / Line 7 – In Claim 17, delete "c=(1+N)m ·(h$^r$" and insert -- c=(1+N)$^m$ .(h$^r$ --, therefor.

Column 22 / Line 1 – In Claim 19, delete "co to cs" and insert -- $c_0$ to $c_s$ --, therefor.

Signed and Sealed this  
Fifteenth Day of December, 2020

Andrei Iancu  
*Director of the United States Patent and Trademark Office*